July 14, 1970  TAKASHI FUJII  3,520,597
CONTROL CIRCUIT FOR AUTOMATIC STOP DEVICE Filed March 19, 1968  2 Sheets-Sheet 1

INVENTOR
TAKASHI FUJII

BY *Wendoroth, Lind & Ponack*
ATTORNEYS

July 14, 1970   TAKASHI FUJII   3,520,597
CONTROL CIRCUIT FOR AUTOMATIC STOP DEVICE
Filed March 19, 1968   2 Sheets-Sheet 2

INVENTOR
TAKASHI FUJII

BY *Wenderoth, Lind & Ponack*
ATTORNEYS

United States Patent Office 3,520,597
Patented July 14, 1970

3,520,597
CONTROL CIRCUIT FOR AUTOMATIC STOP DEVICE
Takashi Fujii, Nagoya, Japan, assignor to Elmo Company Limited, Nagoya, Aichi, Japan
Filed Mar. 19, 1968, Ser. No. 714,198
Claims priority, application Japan, Mar. 29, 1967, 42/19,211
Int. Cl. G03b 19/18, 9/06
U.S. Cl. 352—141  2 Claims

ABSTRACT OF THE DISCLOSURE

In a cinematographic camera a photoelectric element is disposed to continuously receive a ray of light from an object to be photographed in the inoperative state of the associated shutter while it intermittently receives the ray of light in the operating state of the shutter. In the operation of the shutter, a capacitor is very rapidly charged through a transistor of emitter follower configuration in response to the incidence of light upon the photoelectric element and tends to be very slowly discharged through another transistor of emitter follower configuration upon the removal of light from the element. However before the capacitor is discharged to an appreciable extent, it is again charged due to the re-incidence of light on the photoelectric element. Thus a voltage across the capacitor closely approximates that developed in the inoperative state of the shutter. Then the voltage across the capacitor is applied to an ammeter to control a stop.

This invention relates to an electric circuit for controlling an automatic stop device for use in a miniature cinematographic camera.

There has been already known the type of automatic stop devices for use in miniature cinematographic cameras including a light receiver element or a photoelectric element having a ray of light from an object to be photographed incident thereupon through the associated shutter. In such devices the photoelectric element has provided an output different in the operating state of the shutter from in the inoperative state thereof. In order to eliminate such output difference, it has been previously proposed to operatively associate an optical filter or the like with the photoelectric element with unsatisfactory results.

Accordingly it is an object of the invention to provide a new and improved electric circuit for controlling an automatic stop device for use in a miniature cinematographic camera in which an exposure is automatically controlled in accordance with a maximum output from a light receiver element involved due to a ray of light incident thereupon regardless of whether the associated shutter is operated or inoperative whereby the disadvantages of the prior art practice are eliminated.

Briefly, the invention accomplishes this object by the provision of an electric circuit for controlling an automatic stop device for use in a miniature cinematographic camera including a shutter member for intermittently interrupting a ray of light from an object to be photographed incident upon a photosensitive medium and a diaphragm member for controlling the quantity of the ray of light, the circuit comprising a photoelectric element capable of continuously receiving the ray of light in the operative state of the shutter member and intermittently receiving the ray of light in the operative state of the shutter member, a time-integral of a light quantity incident upon the photoelectric element for a predetermined period of time being different in magnitude between the inoperative and operating states of the shutter member and an ammeter for controlling the diaphragm member, characterized by a capacitor, a charging circuit having a low output impedance and responsive to the incidence of light upon the photoelectric element to charge the capacitor at a high rate, a discharging circuit having a high input impedance to discharge the capacitor at a low rate in the absence of light incident upon the photoelectric element, and means for electrically connecting the discharging circuit to the ammeter whereby a continuous current substantially proportional to a maximum magnitude of an output from the photoelectric element is caused continuously to flow through the ammeter in both the inoperative and operating states of the shutter member.

Preferably, each of the charging and discharging circuits may comprise a transistor of common-collector configuration having an emitter resistor connected to the emitter electrode thereof and a semiconductor diode may be connected between the charging circuit and the capacitor and poled to prevent the capacitor from being discharged through the charging circuit.

The invention will become more readily apparent from the following detailed description taken in conjunction with the accompanying drawings in which.

Figure 1:
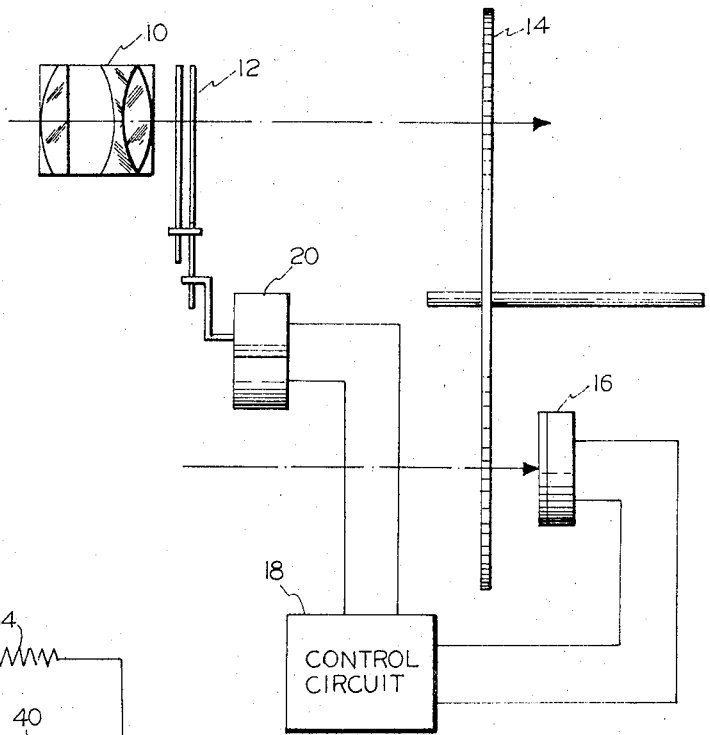
FIG. 1 is a schematic view of an automatic stop device to which the invention can be applied.

Referring now to the drawings and FIG. 1 in particular, it is seen that a ray of light from an object to be photographed (not shown) is first focussed by a photographic objective 10 and then passed through a diaphragm member consisting, for example, of a pair of rotatable diaphragm sectors 12, and a rotary shutter member 14 including one portion permitting the ray light to be transmitted therethrough and the other portion preventing it from being transmitted therethrough until the focussed ray of light forms an image on a photosensitive medium such as a cinematographic film (not shown). A light receiver element such as a photoelectric element 16 is disposed in rear of the shutter member 14 as viewed in the direction in which the ray of light is propagated to intermittently receive the ray of light through the rotating shutter member 14. However the photoelectric element 16 is adapted to continuously receive the ray of light in the inoperative state of the shutter member. In FIG. 1 the ray of light is represented by dot-and-dash line. The photoelectric element 16 converts the ray of light incident thereupon to an electrical signal such as an electric current or an electromotive force which may, in turn, be applied to an ammeter 20 directly or through a control circuit 18. Then the ammeter 20 controls an aperture defined by the diaphragm sectors 12 to maintain the ray of light reaching the film at a predetermined fixed intensity. In other words, if the ray of light from the object to be photographed is strong in intensity, the aperture defined by the diaphragm sectors 12 decreases in area while if the ray of light is weak the area of the aperture increases.

Figure 4:
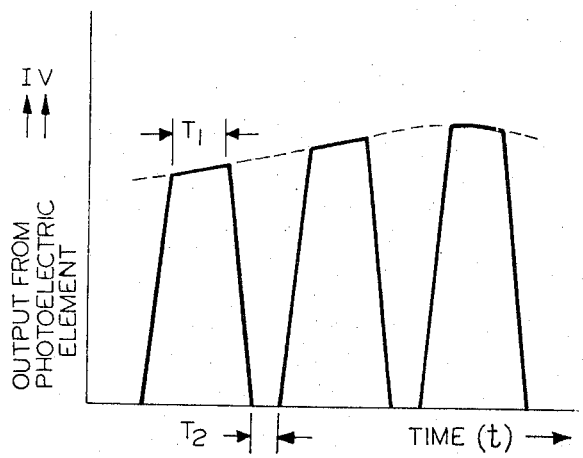
FIG. 4 is a graph useful in explaining the operation of the invention.

Since the ray of light is caused intermittently to fall upon the photoelectric element 16 in the operating state of the shutter member 14 the corresponding electric current or electromotive force provided by the element has a series of discrete waveforms as shown at solid line in FIG. 4 wherein the axis of ordinate represents an output or an electric current or an electromotive force provided by the photoelectric element 16 and the axis of abscissas represents time. More specifically, considering one complete revolution of the shutter member 14, it will be seen that for a period of time $T_1$, the ray of light continues to be incident upon the photoelectric element 16 to provide at the output thereof an electric current or an electromotive force proportional to a brightness of the particular object to be photographed. However, for a period of time $T_2$ the shutter member 14 prevents the ray of light from reaching the photoelectric element 16 resulting in the absence of such an electric current or electromotive force.

It is noted that FIG. 4 shows the waveforms varying in amplitude with time. This means that as the particular object to be photographed varies in brightness with time the electric current or electromotive force provided by the photoelectric element 16 changes correspondingly.

In the case the photoelectric element 16 provides intermittently its output, a time-integral of the output will be of a certain magnitude lying between a maximum and a minimum amplitude thereof.

It is now assumed that the shutter member 14 is in its inoperative state under which it allows a ray of light from an object to be photographed to continuously pass to the photoelectric element 16. Under these assumed conditions, the element 16 will provide a continuous electric current or electromotive force as shown at curve having solid curve portions alternating dotted curve portions in FIG. 4. Therefore it should be appreciated that a time-integral or a mean value of such an electric current or electromotive force is considerably different from the time-integral of the corresponding quantity obtained with the shutter member 14 in its operating state.

For any cinematographic camera including an automatic stop device directly utilizing the output from the photoelectric element 16 as above described in conjunction with FIG. 4, an exposure control magnitude obtained with the associated shutter put in its inoperative state never provides a proper exposure. Also it is impossible to accomplish an under- or over-exposure through the manual setting of the camera to the said control magnitude. Further a short time is generally spent before a stop varies from its magnitude obtained in the inoperative state of the shutter to that obtained in the operating state thereof. This leads to a fear that several frames on the associated cinematographic film immediately after the initiation of a photographing operation will be improperly exposed to light.

Therefore a difference between exposure control magnitudes obtained in the inoperative and operating states of the associated shutter for the same object to be photographed is well enough to decrease the reliability of the conventional automatic stop devices.

In order to eliminate the abovementioned disadvantages, it has been previously proposed to operatively associate an optical attenuator such as a reticulate member, an optical filter or the like with that portion of a shutter causing a ray of light from an object to be photographed to reflect toward or fall upon the associated photoelectric element such that a time-integral of a light quantity applied to the photoelectric element in the inoperative state of the shutter is substantially equal to that in the operating state thereof.

However, a photoelectric material such as cadmium sulfide commonly used with automatic stop devices such as previously described has generally a build up current response to the incidence of light thereupon different from a decaying current response to the removal of light therefrom. In addition these current responses appreciably vary between individual elements made of the same photoelectric material. Thus, assuming that the abovementioned optical attenuator has a predetermined constant attenuation of light it is actually difficult either to consistently combine such optical attenuators with all the photoelectric elements of the same material varying in the current responses as above described, or to switch or control the associated electric component each time the shutter changes from its inoperative state to its operating state and vice versa.

The invention contemplates to eliminate the abovementioned disadvantages and other difficulties of the conventional devices and is based upon the principles that an automatic stop device is controlled with a maximum magnitude of associated photoelectric element rather than with a mean magnitude thereof regardless of whether the associated shutter is put in its operating or inoperative state.

While the invention will now be described in conjunction with a photoelectric element disposed in rear of the associated shutter as viewed in a direction in which a ray of light is propagated it is to be understood that it is equally applicable to a photoelectric element disposed in front of the shutter with an optical reflector attached to that front face portion of the shutter interrupting the ray of light. A ray of light from an object to be photographed is first reflected from the reflector and then incident upon the photoelectric element. Further the invention may be applied to the case a ray of light originating from an object to be photographed and passing through the associated photographic objective and shutter is divided into two ray portions by a prism or a half-transparent member such as a half-silvered plate. Then one of the divided ray portions serves to exposure a photosensitive medium while the other ray portion serves to control an automatic stop device.

Figure 2:
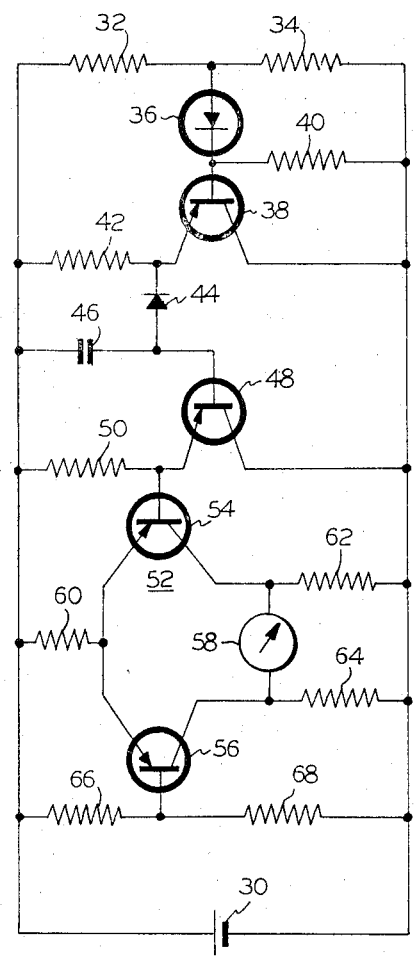
FIG. 2 is a diagram of an electric control circuit constructed in accordance with the principles of the invention.

Referring now to FIG. 2, there is illustrated an electric control circuit constructed in accordance with the principles of the invention. The circuit illustrated comprises any suitable source 30 of direct current for energizing the same, a pair of resistors 32 and 34 serially connected across the source 30 and a photoelectric element 36 connected to the junction of the resistors 32 and 34. The photoelectric element 36 is assumed to be a solar cell having a fast response and corresponds to the photoelectric element 16 as shown in FIG. 1.

A charging transistor 38 shown as being of a PNP type has a base electrode connected to the photoelectric element 36 and to the negative terminal of the source 30 through a base resistor 40, a collector electrode connected to the negative terminal of the source 30, and an emitter electrode connected to the positive terminal of the source 30 through an emitter resistor 42 and to a cathode electrode of a blocking semiconductor diode 44. A control capacitor 46 is connected across the series combination of the resistor 42 and the diode 44 poled to permit a current to flow from the capacitor 46 to the transistor 38.

A discharging transistor 48 shown as being also of a PNP type has a base electrode connected to the junction of the diode 44 and the capacitor 46, a collector electrode connected to the negative terminal of the source 30 and an emitter electrode connected to the positive terminal of the source 30 through an emitter resistor 50.

Each of the transistors 38 and 48 is of a common-collector configuration and forms an emitter follower circuit along with the associated emitter resistor. As well known, an emitter follower circuit is very low in output impedance and very high in input impedance. Thus the capacitor 46 is adapted to be charged at a very high rate mainly through a charging circuit including the diode 44 and the emitter and collector electrodes of the transistor 38 and having a very small time constant.

The resistors 32, 34 and 42 are selected to operate the transistor 38 over a suitable range of base currents. In the absence of light incident upon the photoelectric element 36, the transistor 38 has preferably a low base current flowing therethrough. Therefore the capacitor 46 has a low charge which can, in turn, put the transistor 48 in its low base current state.

The emitter resistor 50 is connected to an input of a differential amplifier generally designated by the reference numeral 52. The circuit 52 is of the conventional construction and includes a pair of PNP type transistors 54 and 56 having the respective emitter electrodes connected together and the respective collector electrodes bridged by an ammeter 58 corresponding to the ammeter 20 as shown in FIG. 1. Both emitter electrodes are connected to the positive terminal of the source 30 through a common emitter resistor 60 while the collector electrodes are connected to the negative terminal of the source 30 through the respective resistors 62 and 64. The base electrode of the transistor 56 is connected to the junction of resistors 66 and 68 serially connected across the source 30 and suitably biased to cause the ammeter 58 to maintain a predetermined stop in the absence of light incident upon the photoelectric element.

Figure 5:
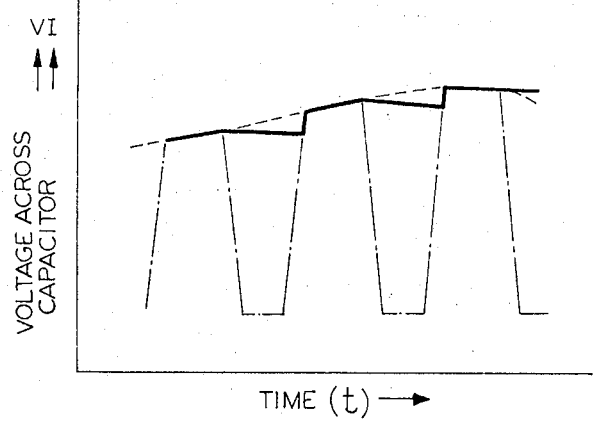
FIG. 5 is a graph illustrating waveforms appearing in the circuit shown in FIG. 2 or 3.

The control circuit illustrated is operated as follows: Assuming that the associated shutter such as the shutter 14 shown in FIG. 1 is rotating, a ray of light from an object to be photographed (not shown) intermittently falls upon the photoelectric element 36 which, in turn, produces a series of electromotive forces having a waveform such as shown at solid line in FIG. 4 with the junction of the resistors 32 and 34 being positive with respect to the junction of the element 36 and transistor 38. This causes the transistor 38 to be intermittently brought into high conducting state to intermittently increase a flow of emitter current through and therefore a voltage across the emitter resistor 42. When the voltage across the emitter resistor 42 is rising the capacitor 46 is charged at a very high rate through the charging circuit traced from the positive terminal of the source 30, through the capacitor 46, the diode 44, the emitter and collector electrodes of the transistor 38 and back to the negative terminal of the source and having a very small time constant as previously described. FIG. 5 shows a voltage across the capacitor plotted against time.

When the shutter then interrupts the ray of light the electromotive force across the photoelectric element 36 begins to decay to bring the transistor 38 into its low base circuit state whereupon the capacitor 46 terminates to be charged. Then the capacitor 46 tends to be discharged through the emitter resistor 42 and the diode 44 on the one hand and through the emitter resistor 50 and the base and emitter electrodes of the transistor 48 now highly conducting due to the voltage across the capacitor 46 on the other hand. However the discharge of the capacitor 46 through the resistor 42 is substantially prevented by the diode 44 and its discharge through the resistor 50 is accomplished at a very low rate because the transistor 48 is very high in input impedance as previously described. Thus before the voltage across the capacitor 46 scarcely decreases and strictly speaking, after that voltage has decreased by a small amount as shown at solid line extending between a pair of adjacent waveforms in FIG. 5, the ray of light passed through the shutter again falls upon the photoelectric element 36 to produce an electromotive force leading to the charging of the capacitor 46. The process just described is repeated and the voltage across the capacitor 46 follows a broken solid line as shown in FIG. 5. From FIG. 5 it will be seen that the broken solid line closely approximates a continuous curve having solid curve portions alternating dotted curve portions which represents a voltage developed across the capacitor 46 in the operative state of the shutter. Therefore the resistor 50 has developed thereacross a voltage proportional to the voltage as shown at the broken solid line in FIG. 5 and scarcely different in magnitude between the operating and inoperative states of the shutter.

The voltage across the resistor 50 is suitably amplified by the differential amplifier circuit 52 and controls the polarity and magnitude of a current following through the ammeter 58 thereby to operate diaphragm sectors such as shown at 12 in FIG. 1 to maintain the optimum stop.

Figure 3:
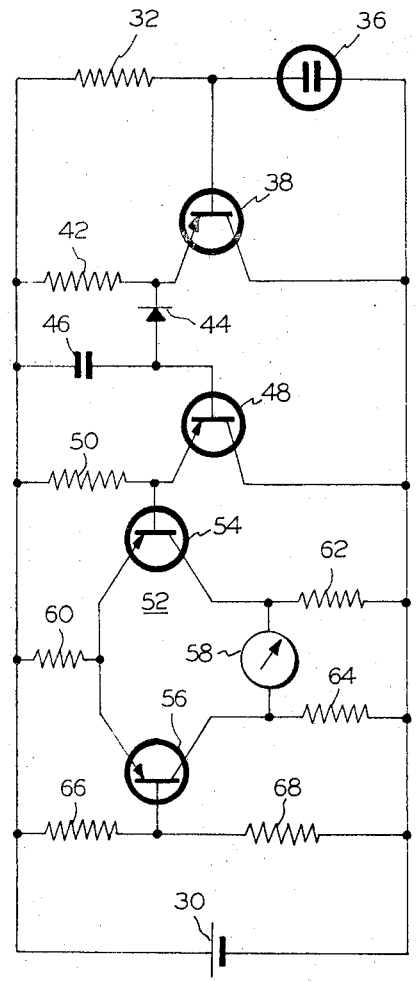
FIG. 3 is a circuit diagram of a modification of the invention.

FIG. 3 shows a modification of the invention utilizing for example a cadmium sulfide cell as a photoelectric element. In FIG. 3, a photoelectric element 36 such as a cadmium sulfide element having a fast response is connected between the junction of a resistor 32 and a base electrode of a charging transistor 38 and a negative terminal of a source 30 of direct current. In other respects the arrangement is identical to that shown in FIG. 2. Therefore like reference numerals have been employed to identify the corresponding components and the description therefore need not be made.

From the foregoing it will be appreciated that the invention has provided an automatic stop device by which a diaphragm member is always controlled with a maximum magnitude of an output from a photoelectric element involved due to a light quantity incident thereupon regardless of whether the associated shutter is put in its operating or inoperative state without the necessity of introducing any compensation each time the shutter changes from its inoperative state to its operative state and vice versa.

While the invention has been illustrated and described in conjunction with a few preferred embodiments thereof it is to be understood that numerous changes in the details of construction and the arrangement and combination of parts may be made without departing from the spirit and scope of the invention. For example, the transistors and diode may have the conductivity type and polarity reversed from those illustrated with the source of direct current correspondingly reversed in polarity. If desired, any suitable amplifier circuit may be used in place of the differential amplifier circuit as previously described.

What I claim is:

1. In an electric circuit for controlling an automatic stop device for use in a miniature cinematographic camera including a shutter member for intermittently interrupting a ray of light from an object to be photographed incident upon a photosensitive medium, and a diaphragm member for controlling the quantity of the ray of light, the combination of a photoelectric element capable of continuously receiving the ray of light in the inoperative state of said shutter member and intermittently receiving the ray of light in the operating state of said shutter member, a time-integral of a light quantity incident upon said photoelectric element for a predetermined period of time being different in magnitude between the inoperative and operative states of said shutter member, a capacitor, a charging circuit having a low output impedance and responsive to the incidence of light upon said photoelectric element to charge said capacitor at a high rate, a discharging circuit having a high input impedance for discharging said capacitor at a low rate in the absence of light incident upon said photoelectric element, an ammeter for controlling said diaphragm member, and means for electrically connecting said discharging circuit to said ammeter whereby a continuous current substantially proportional to a maximum magnitude of an output from said photoelectric element is caused continuously to flow through said ammeter in both the inoperative and operating states of said shutter member.

2. An automatic stop device as claimed in claim 1, wherein each of said charging and discharging circuits comprises a transistor of common-collector configuration having an emitter resistor connected to the emitter electrode thereof, and a semiconductor diode is connected between said charging circuit and said capacitor and poled to prevent said capacitor from being discharged through said charging circuit.

References Cited

UNITED STATES PATENTS

| | | |
|---|---|---|
| 3,122,978 | 3/1964 | Blieske. |
| 3,426,662 | 2/1969 | Sevin. |
| 3,430,053 | 2/1969 | Westhaver. |

NORTON ANSHER, Primary Examiner

J. F. PETERS, JR.

U.S. Cl. X.R.

95—10, 64